United States Patent [19]

Sarko et al.

[11] Patent Number: 5,009,511

[45] Date of Patent: Apr. 23, 1991

[54] INORGANIC RECYCLING PROCESS

[75] Inventors: Leonard S. Sarko, Dublin; Richard S. Lyon, Galion, both of Ohio

[73] Assignee: Inorganic Recycling Incorporated, Columbus, Ohio

[21] Appl. No.: 471,042

[22] Filed: Jan. 26, 1990

Related U.S. Application Data

[63] Continuation of Ser. No. 110,447, Oct. 20, 1987, abandoned.

[51] Int. Cl.$^5$ .............................................. B01F 7/08
[52] U.S. Cl. .................................. 366/348; 366/144; 366/279; 210/673; 210/721
[58] Field of Search ............................................. 366/1

[56] References Cited

U.S. PATENT DOCUMENTS

| | | | |
|---|---|---|---|
| 3,862,746 | 1/1975 | Franz et al. | 366/348 |
| 3,870,082 | 3/1975 | Hall | 55/226 |
| 3,942,970 | 3/1976 | O'Donnell | 210/770 |
| 4,019,444 | 4/1977 | Kleeberg et al. | 55/226 |
| 4,046,689 | 9/1977 | Argyll | 210/770 |
| 4,177,575 | 12/1979 | Brooks | 366/147 |
| 4,226,712 | 10/1980 | Kamei | 210/770 |
| 4,229,295 | 10/1980 | Krofchak | 210/751 |
| 4,263,024 | 4/1981 | Vander Velden et al. | 55/226 |
| 4,266,916 | 5/1981 | Lubavs | 425/62 |
| 4,600,514 | 7/1986 | Conner | 210/751 |
| 4,657,681 | 4/1987 | Hughes et al. | 210/770 |

FOREIGN PATENT DOCUMENTS

| | | | |
|---|---|---|---|
| 50-25475 | 3/1975 | Japan | 210/770 |
| 51-52678 | 5/1976 | Japan | 210/770 |
| 51-87474 | 7/1976 | Japan | 210/770 |
| 52-32635 | 8/1977 | Japan | 210/770 |
| 7300109 | 7/1974 | Netherlands | 210/770 |

Primary Examiner—Frankie L. Stinson

[57] ABSTRACT

The present invention relates to a mobile inorganic recycling process and apparatus. In the preferred embodiment, the invention includes two vehicles, a first of which is utilized to receive hazardous wastes and mix them with treating chemicals and a second of which is provided to fixate the hazardous wastes into end products which are usable by consumers. The fixating vehicle includes a sophisticated scrubber designed to render inoffensive the hazardous gases which are created as a result of the process carried out in the vehicles. The inventive system is useful in converting all hazardous inorganic wastes into end products which do not include any hazardous aspect.

9 Claims, 6 Drawing Sheets

INORGANIC RECYCLING PROCESS

This application is a continuation of application Ser. No. 07/110,447 filed Oct. 20, 1987 and now abandoned.

BACKGROUND OF THE INVENTION

Technology designed to recycle hazardous waste is relatively new. Rules and regulations generally administered by the Environmental Protection Agency were initially developed to control storage, transportation and disposal by landfill of hazardous wastes. In situations where hazardous waste was being generated by a company, however, the company was required to minimize such hazardous waste generation and to curtail land filling immediately.

In light of the above described circumstances, recycling entities developed mobile systems to service hazardous waste generators at the site of the generation of the hazardous waste. The hazardous waste handling regulations allowed mobile systems where permanently installed systems could not be used and allowed hazardous waste generators and recycling entities to comply with the law while operating in a manner which was advantageous to both.

All known mobile waste recycling systems operate to encapsulate hazardous wastes rather than incorporating them into a matrix of material which may not be broken down by normal physical or chemical means. When encapsulation is employed, there is always the danger of loss of the integrity of the capsule, i.e., cracking, breakage, etc. which would allow release of the hazardous wastes.

Applicant is aware of the following United States patents which are generally related to the subject matter of mobile waste treatment facilities:

U.S. Pat. No. 3,659,979 to Schneider, et al. discloses a plant for manufacturing small structural elements out of concrete and includes a production station and a hardening station, both of which are transportable on flat-bed-type trailers to a specific site, unloaded, used, and then retransportable to another site.

U.S Pat. No. 4,072,453 to Oltmanns, et al. discloses a plant for the production of tubular articles such as corrugated drain pipes out of synthetic material which is mounted in a trailer for transport. The raw material is fed into the plant by a flexible conveying screw to fill the hopper of an extruder whereupon a forming and conveying device takes the extrudate to form the tubular product which is then wound upon a storage reel.

U.S. Pat. No. 4,266,916 to Lubavs discloses a mobile block production plant wherein the producing station and curing station are separately mounted on mobile trailer beds with the curing station having at least two curing kilns, each capable of separate function.

Further, U.S. Pat. No. 1,454,082 to Schlosser discloses a facility for treatment of waste wherein the waste is separated as to type and treated and dealt with according to its nature and uses to be made thereof. Schlosser relates to a method of utilizing domestic and industrial garbage and other refuse.

Finally, U.S. Pat. No. 3,893,656 to Opacic, et al. discloses a mobile unit for treating liquid waste having a bin for a powdered setting agent with an outlet at its bottom and a porous floor spaced above the bottom. Compressed air is delivered to the space beneath the floor to form a fluidized bed of setting agent above the floor. The setting agent is delivered to the mixing hopper in which it is mixed with liquid waste whereupon the mixture leaves the hopper.

The following U.S. Pat. Nos. are known to applicant and disclose various well known processes for treating waste materials: U.S. Pat. No. 3,837,872 to Conner, U.S. Pat. No. 3,841,102 to Conner, U.S. Pat. No. 4,012,320 to Conner, et al., U.S. Pat. No. 4,116,705 to Chappell, U.S. Pat. No. 4,118,243 to Sandesara, U.S. Pat. No. 4,146,185 to Schober, U.S. Pat. No. 4,169,791 to Johnson, Jr., et al., U.S. Pat. No. 4,230,568 to Chappell, U.S. Pat. No. 4,274,880 to Chappell, U.S. Pat. No. 4,284,514 to Wright, U.S. Pat. No. 4,340,396 to Robinson-Todd, U.S. Pat. No. 4,400,936 to Evans, U.S. Pat. No. 4,471,916 to Donaldson, U.S. Pat. No. 4,474,479 to Redelman and U.S. Pat. No. 4,509,696 to Donaldson.

As will be described in greater detail hereinafter, the inventive mobile inorganic recycling apparatus includes a sophisticated scrubber device through which a gas is taken to remove all hazardous materials therefrom and render the gas benign. While some of these patents teach some aspects of the inventive scrubber, none of these patents teaches all of the aspects thereof and any combination of these references does not teach all of the aspects of the present invention. These United States patents are the following: U.S. Pat. No. 1,994,776 to Heglar, U.S. Pat. No. 2,150,745 to Mieras, et al., U.S. Pat. No. 3,325,632 to Berneike, et al., U.S. Pat. No. 3,334,471 to Herron, U.S. Pat. No. 3,456,709 to Vegeby, U.S. Pat. No. 3,856,487 to Perez, U.S. Pat. No. 3,971,642 to Perez, U.S. Pat. No. 4,005,999 to Carlson, U.S. Pat. No. 4,052,042 to Hegemann, et al., U.S. Pat. No. 4,055,331 to Hegemann, et al., U.S. Pat. No. 4,235,609 to Garigioli, U.S. Pat. No. 4,260,563 to Brulhet, U.S. Pat. No. 4,394,139 to Board, U.S. Pat. No. 4,472,324 to Hawryluk and U.S. Pat. No. 4,547,353 to Cameron.

A need has developed for a mobile inorganic recycling process and apparatus which will enable not only the treatment of hazardous wastes but their conversion into materials which may be useful in other applications such as road paving, construction and the like. It is in this context that the present invention was developed.

SUMMARY OF THE INVENTION

The present invention overcomes the deficiencies found in the prior art as set forth hereinabove and provides a new and improved mobile inorganic recycling process and apparatus which combines convenience to the customer with maximized capacity in a portable system. The present invention includes the following interrelated features and aspects:

(a) In a first aspect, in the preferred embodiment of the present invention, the inventive apparatus includes two mobile vehicles. The first vehicle comprises a mixing truck having a loading station for material to be processed, and a feed chute feeding material from the loading station to a feed hopper leading to an auger.

(b) The auger de-lumps the material whereupon it is fed via a feed conveyor to a reactor tank having fluid connection with a chemical storage area so that chemicals may be added to the reactor tank with material to be processed therein. The reactor tank has mounted therein a stirring device designed to thoroughly mix the material to be processed with the added chemicals. Alternatively, the functions of the auger, reactor tank, recirculation system and loading station may be combined into a single tank having a mixing blade with inner and outer helices, oppositely directed, with the outer helix in close proximity with the tank bottom. The tank has a bottom outlet port controlled by a valve and located above the tray loading station. Whichever embodiment is used, after the material is loaded into the reactor mixing tank, first, chemicals are added causing an oxidation-reduction reaction to occur, and, thereafter, further chemicals are added to the oxidized-reduced material which further chemicals include silicates which will chemically react with the material when heated to a high temperature to cause the material to be bound into a silicate matrix which is inert and inseparable by typical physical or chemical means.

(c) From the reactor tank, in the first mentioned embodiment, the material is pumped to a loading station where it is transferred to the second vehicle termed a fixation trailer.

(d) The fixation trailer has associated therewith a container lifting and loading device designed to lift containers received from the mixing truck and to convey them to a kiln or furnace wherein energy is imparted to the material so that final chemical reactions may take place.

(e) As a natural result during heating operations in the kiln or furnace, certain corrosive and dangerous gases having particulates included therein may be formed. For this purpose, a duct is provided connecting the interior of the kiln or furnace to a scrubber mechanism. The scrubber mechanism will be described in much greater detail hereinafter and consists of numerous stages of treatment wherein the gases are sprayed, demisted, sprayed again, led through grids and screens as well as absorbers to remove all harmful particulate and gaseous materials whereupon the scrubbed gas is allowed to flow out of the scrubber unit.

(f) After the heating cycle has been completed in the kiln or furnace, the fired material is removed through the use of the container lifting and loading device from the recycling trailer and to a processed material storage facility where the material is stored until loaded on vehicles to be removed from the site. The material which is removed from the kiln or furnace comprises a matrix of silicate based material which may not be broken down by normal physical or chemical means.

(g) Each of the vehicles which combine to comprise the present invention includes completely self-contained power systems facilitating operation without the need for outside hookup. Thus, for example, a diesel generator may be provided in the mixing truck to power the pump, stirrer and loading structure as well as the auger and conveyor and other electrical needs. In a similar way, the fixation trailer includes a diesel generator for providing electricity to power all systems and may also include propane supply for the kiln or furnace if the kiln or furnace is to be gas-fired. Of course, outside power hook-up may be utilized if available.

Accordingly, it is a first object of the present invention to provide a new, improved mobile inorganic recycling process and apparatus.

It is a further object of the present invention to provide such an apparatus which includes two mobile vehicles.

It is a still further object of the present invention to provide such an apparatus wherein a first vehicle is utilized to macerate the material to be treated and add chemicals thereto and wherein the second vehicle is utilized to heat the material and remove harmful particulate gases therefrom.

It is a still further object of the present invention to provide a system wherein harmful substances may be transformed into usable inert materials.

These and other objects, aspects and features of the present invention will be better understood from the following detailed description of the preferred embodiment when read in conjunction with the appended drawing figures.

SPECIFIC DESCRIPTION OF THE PREFERRED EMBODIMENTS

Before discussing in great detail the specific aspects of the present invention as illustrated in the appended drawing figures, it is believed appropriate to discuss a general overview of the present invention in a manner best setting the stage for the specific description to follow.

Many recycling systems have been developed to treat hazardous wastes and the patents discussed hereinabove are representative of such systems. The vast majority of recycling systems deal with organic hazardous wastes including the use of waste to energy systems and the distillation of solvents. Systems designed to recover copper, gold and other metals will be better described as treating specific inorganic constituents. An inorganic recycling system is applicable to all inorganics, as opposed to metal specific, and the bonding chemistry is amenable whether the constituents are segregated or mixed.

In typical applications, specific inorganic recovery systems are set for only the specific constituent which is desired to be removed and such systems generally fail if mixtures or strict constituent guidelines are not met.

Organic substance treatment systems are generally geared to vaporization of a constituent or incineration whereas inorganic elements do not incinerate. They may become molten but do not break down any further and in most cases the vaporization temperatures of the inorganic substances are too high to be useful. Accordingly, systems designed to treat organic wastes may not be used to treat inorganic wastes.

In the operation of the present invention, there is no need to concern one's self with chemically fixating any organic materials which might be present in the mixture. Since the present invention includes the use of a kiln or furnace to fire the waste material at high temperatures, any organic material which would be present would necessarily be destroyed during the kiln treating process.

The present invention operates by chemically reacting the inorganic constituent substances in the mixture through a series of oxidation-reduction reactions which place the constituents into a chemical state which will allow subsequent binding. In order to cause these reactions to take place, a variety of inorganic acids and alkalies are used which will be described in greater detail hereinafter. After mixing such substances with the hazardous waste, the mixture is then further blended with silicates such as sand or clay which are included based upon the desired end product. After completely mixing all the constituent parts together, heat is imparted to the mixture to cause chemical reactions to take place causing the inorganic constituent materials to bind into a silicate matrix which is inert and inseparable by typical physical or chemical means. After chemically fixating the treated material, the resultant product is packaged and shipped to end users.

Whenever one is handling or otherwise treating hazardous wastes, governmental guidelines always come into play as to how and under what circumstances the material will be handled and dispensed with. Governmental guidelines differentiate between recycling and reclaiming. According to government guidelines, reclaiming involves regeneration of wastes or the recovery of materials from wastes. Under the material recovery definition, the recovery material itself is considered recycled whereas the residue that is left after the recycling of the recovered part is still considered a hazardous waste. For example, a drum of mixed waste solvents may be treated to remove one such solvent for reuse so that the recovered solvent would be considered recycled and the remainder of mixed solvents would still be considered to be hazardous waste.

On the other hand, governmental guidelines define recycling as the beneficial reuse of the entirety of the material. The present invention is specifically devised and designed to completely recycle the material which is treated thereby. The inorganic constituents found in the hazardous waste are not in any way segregated during the process undertaken according to the teachings of the present invention. All of the constituent substances are included in the final recycled product which is created for beneficial use in some fashion or another.

In carrying out the process contemplated herein, before beginning the recycling process, a complete chemical analysis of the material to be treated is completed. Since the inventive process is only operable for use with a predominantly inorganic mixture, testing is also undertaken to ensure that the mixture is predominantly inorganic. Research by applicant has revealed that so long as the inorganic component of a mixture is no more than twenty percent of the total mixture, the inventive process may be safely undertaken. Radioactive constituents, however, may not be included in any mixture for which the present invention is contemplated to process.

Figure 1:
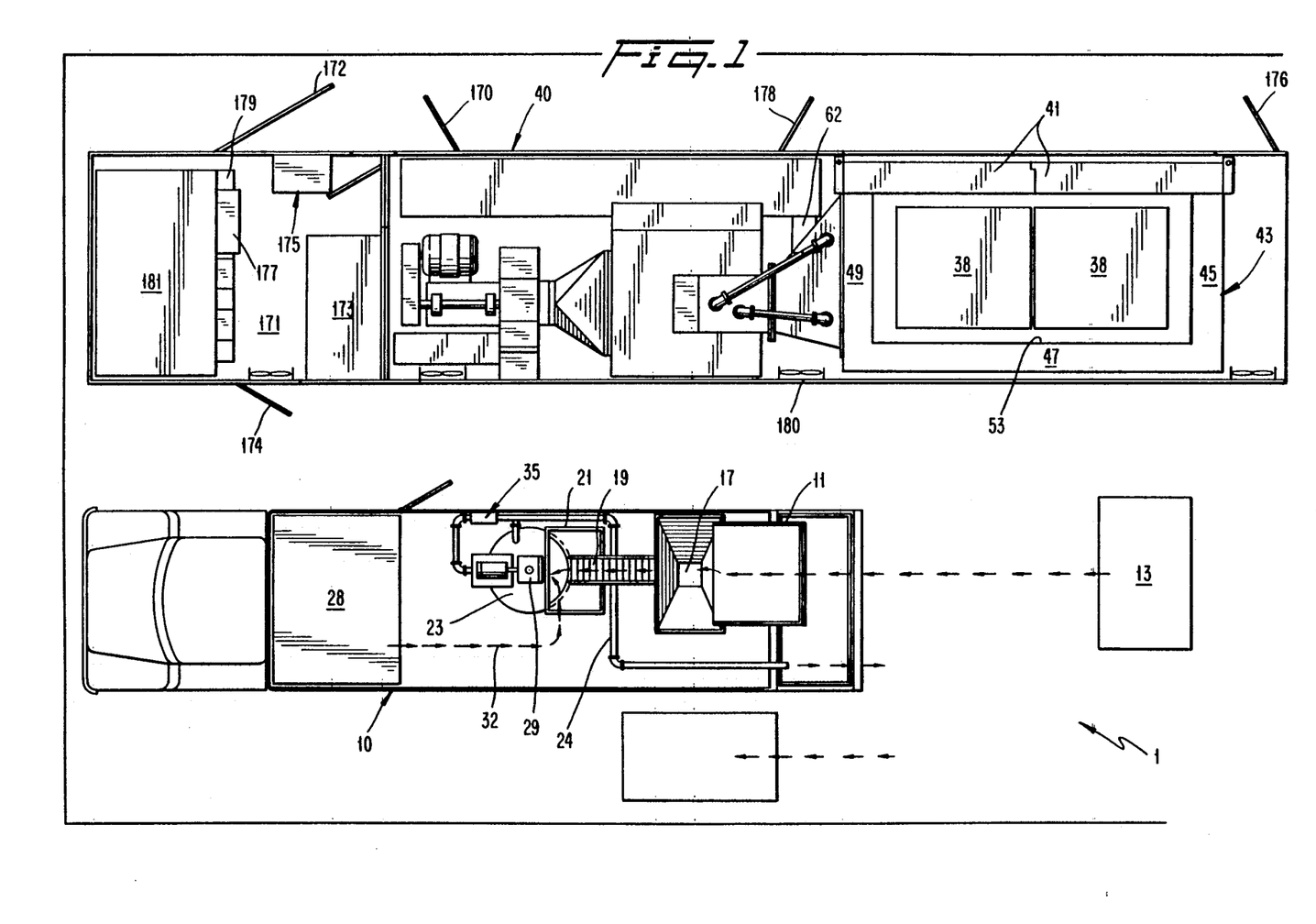
FIG. 1 shows a schematic top view of a first embodiment of the present invention including arrows depicting the direction of flow of the various aspects of the system.
Figure 2:
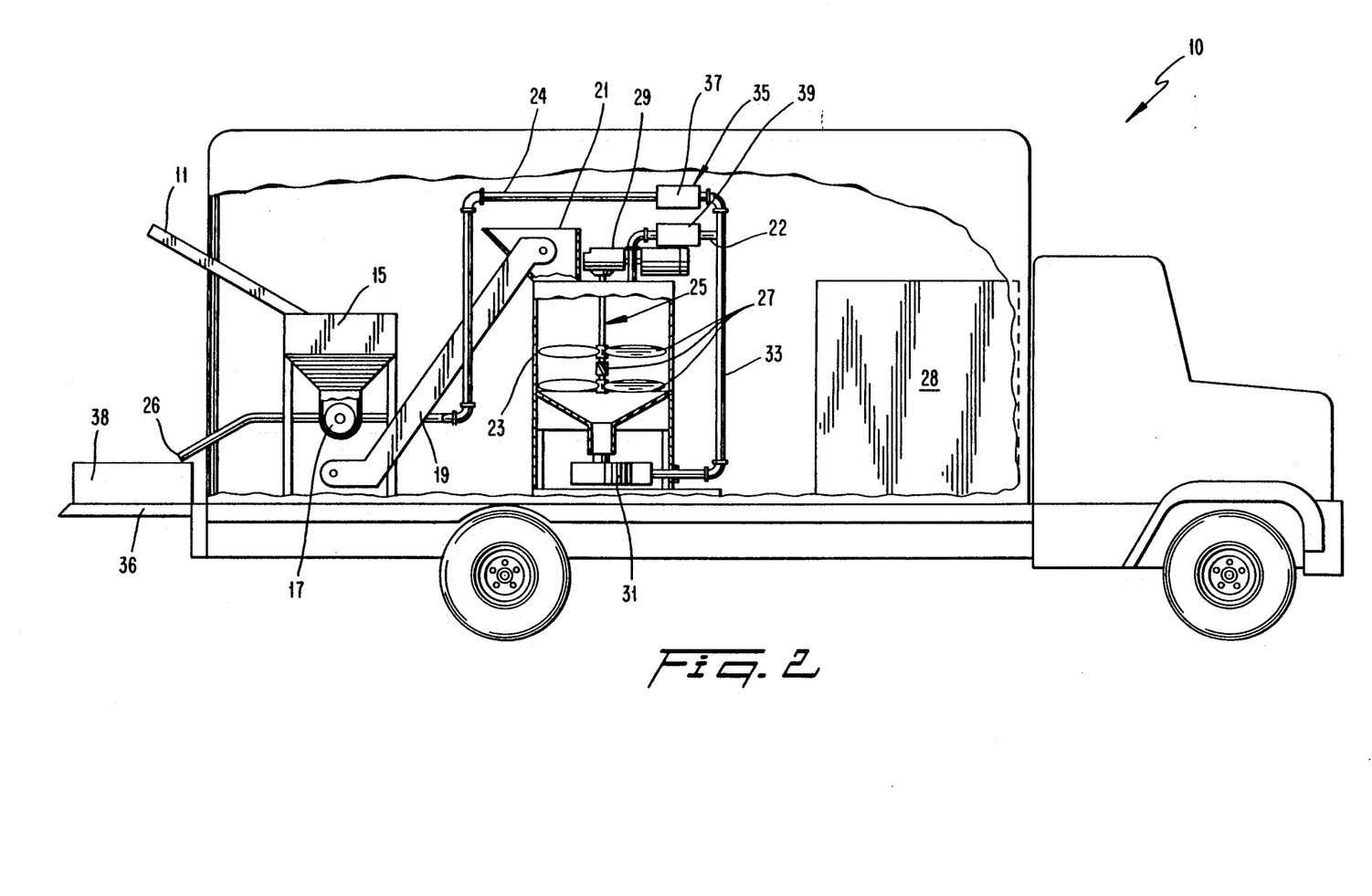
FIG. 2 shows a side view of the mixing truck of the first embodiment of the present invention.

Reference is now made to FIGS. 1 and 2 wherein a first embodiment of the inventive apparatus is designated by the reference numeral 1 and is seen to include a mixing truck 10 and a recycling trailer 40. The mixing truck includes a feed chute 11 situated at the rear of the truck 10 and designed to receive material from a customer material storage vessel 13 and to convey the material, consisting of hazardous inorganic waste, to a feed hopper 15 which leads the material to an auger 17 which acts to grind up any solid aspects thereof, with the auger having an outlet located above a conveyor belt 19 which conveys the material to the inlet manifold 21 of the reactor tank 23.

The reactor tank includes a mixing device 25 including paddles 27 rotated by a motor 29. As best seen in FIG. 2, at the bottom of the reactor tank 23, a pump 31 is provided which pumps the fluid from the tank 23 and through a conduit 33 to a valve 35 including two remotely controlled valves 37, 39.

As seen in FIG. 2, the passageway 33 has connected thereto a first branch passage 22 and a second branch passage 24 with the branch 22 recirculating the fluid back into the tank 23 and with the branch 24 comprising an outlet branch conveying the fluid to a container loading station 36 at the rear of the vehicle and having placed thereon a container 38 which has removably placed therein the outlet 26 of the conduit 24. As containers 38 are filled with mixture from the conduit 24, they are conveyed by any desired means (not shown) to the recycling trailer.

In the preferred embodiment of the present invention, the valves 37 and 39 are solenoid actuated and may comprise a single valve head allowing only one of the branches to be open at any given time. Thus, as the present invention is contemplated, when the valve 39 is opened to allow recirculation of fluid through the conduit 22 back to the reactor tank 23, the valve 37 will be closed precluding fluid flow out the outlet 26. When it is desired to empty the reactor tank 23 so that a new batch may be introduced, the valve 39 is closed and the valve 37 is opened to allow fluid to be pumped by the pump 31 through the conduit 24 to the outlet 36 filling the container 38.

As material is introduced to the reactor tank 23 via the conveyor 19 and manifold 21, treating chemicals from the chemical tank 28 are introduced into the reactor tank 23 via the conduit 32. Of course, if solid chemicals are to be added to the tank 23, they may be loaded via chute 11, hopper 15, auger 17, conveyor belt 19 and inlet manifold 21.

As set forth hereinabove, materials which have had chemical added thereto and which have been thoroughly mixed in the reactor tank 23 are conveyed via the conduit 24, out the outlet 26 and these material fill containers 38 which have been placed on the container loading station for this purpose. Thereafter, each container 38 is conveyed by any desired means from the container loading station 36 to a location adjacent ceramic-lined doors 41 located on a side wall 42 of the recycling trailer 40.

If desired, the subject mixing truck may be simplified by combining the functions of the feed chute 11, feed hopper 15, auger 17, conveyer belt 19, inlet manifold 21 and reactor tank 23 into a single structure.

Figure 5:
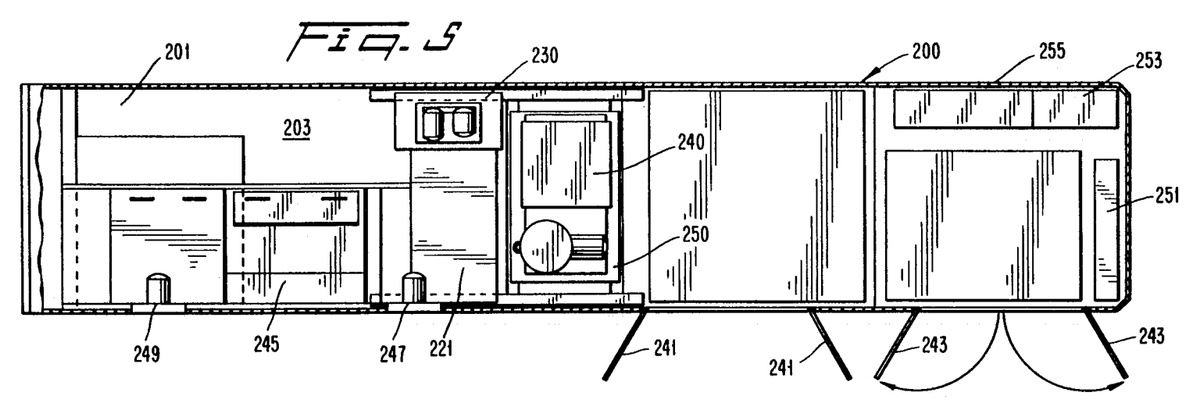
FIG. 5 shows a schematic top view of a second embodiment of a mixing trailer.
Figure 6:
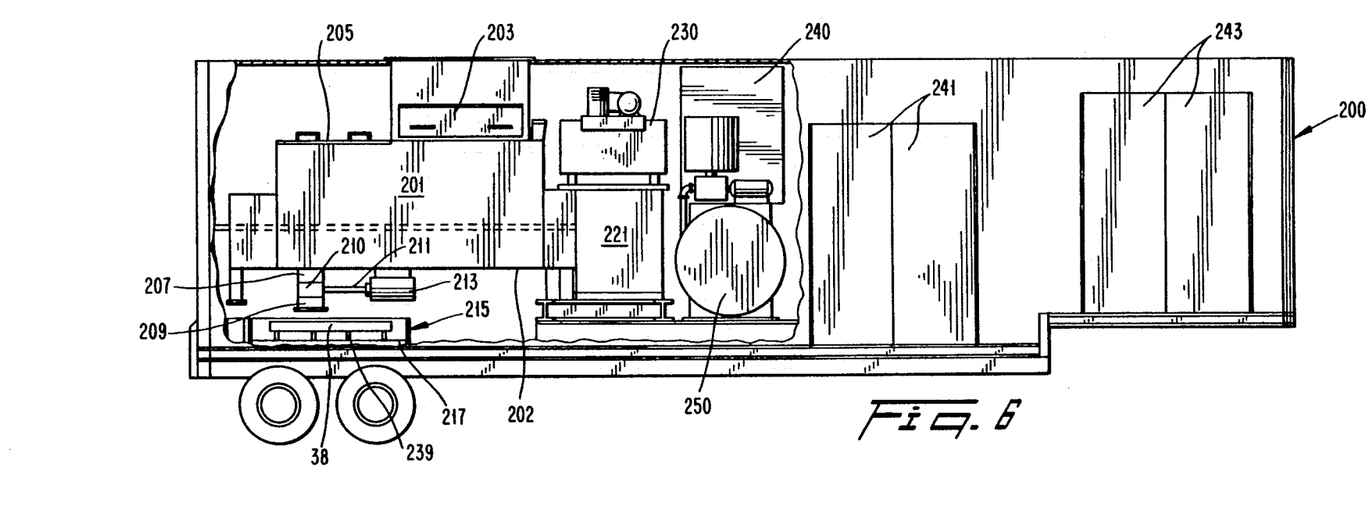
FIG. 6 shows a side view of the mixing trailer of FIG. 5.
Figure 7:
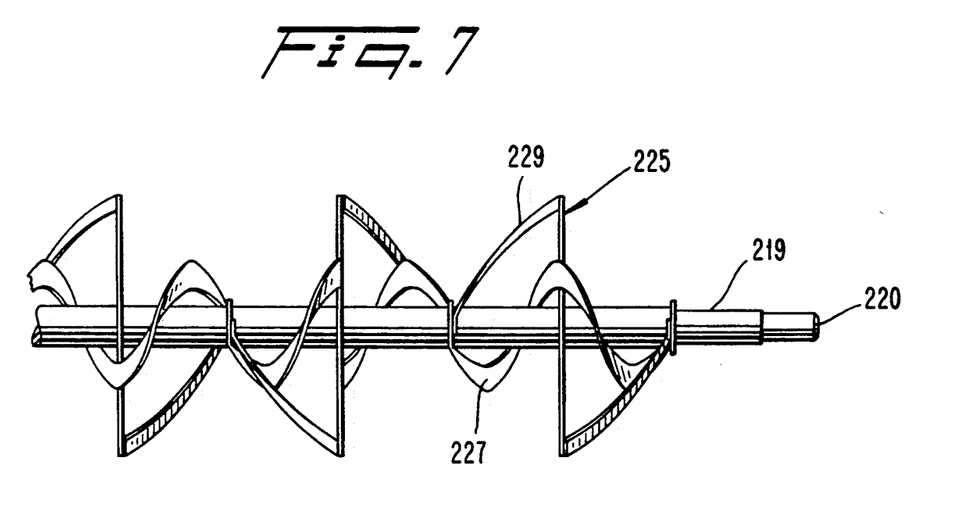
FIG. 7 shows a side view of the mixing blades of the mixer of the embodiment shown on FIGS. 5 and 6.

In this regard, reference is now directed to FIGS. 5, 6 and 7 wherein an alternative embodiment is disclosed which is designed to replace the mixing truck 10.

As seen in FIGS. 5 and 6, the mixing trailer 200 is seen to be of the semi-trailer type. Of course, if desired, the mixing trailer 200 could be incorporated into a vehicle in the same manner as the mixing truck 10. With particular reference to FIG. 6, it is seen that the trailer 200 includes a mixer 201 including a loading door 203, a cover 205, an outlet port 207 connected to an outlet 209 via a gate valve 210 having an actuator stem 211 which is selectively reciprocated through the use of a hydraulic piston-cylinder 213. Of course, the hydraulic actuator 213 may be replaced with other actuation means such as, for example, a solenoid actuator, pneumatic actuator and the like.

The outlet 209 is positioned directly above a tray loading station 215 wherein a tray 38 is seen to be supported on tray support 239 which is surrounded by the spill pan 217 which is provided to catch all overflow from the tray 38.

With further reference to FIG. 6, it is seen that the mixer 201 has an elongated drive shaft (illustrated by dotted lines) extending therethrough. This drive shaft may be rotated by a drive motor 221. As best seen in FIG. 7, this drive shaft, now designated as 219, has fixedly mounted thereon a mixer blade 225 seen to include an inner ribbon helix 227 and an outer ribbon helix 229. As should be understood from FIG. 7, looking down the drive shaft 219 from the end 220 thereof, the inner helix 227 is seen to rotate about the shaft 219 in a clockwise direction whereas the outer helix 229 is seen to rotate about the drive shaft 219 in a counter-clockwise direction. Thus, it should be understood that materials which are located close to the drive shaft 219 will be effected in motion by the inner helix 227 and thereby will be caused to move in a first direction, whereas materials which are located adjacent the outer helix 229 will be effected in motion thereby and will be caused to move in a second opposite direction.

The mixer blade 225 is sized and configured to rotate in closely spaced relation to the bottom surface 202 of the mixer 201. In the preferred embodiment, the bottom surface 202 is made of a semi-cylindrical shape so that throughout the circumference of the surface 202, the outer helix 229 is in closely spaced relation with respect thereto. Thus, the interaction between the outer surfaces of the helix 229 and the inner surfaces of the surface 202 will facilitate de-lumping of materials within the mixer 201.

With further reference to FIG. 6, it is seen that mounted above the mixer drive 221 is an air compressor 230 which is provided to supply air to the various valves in the device as well as for general use in the manner that the air compressor 183, described hereinbelow, is provided.

With further reference to FIG. 6, it is seen that a dust collector 240 is provided within the trailer 200 and is provided to collect any dust which may be created by the mixing action of the mixer 201 or from any other source, since dust which may be created during the inventive process may be hazardous to workers and thus must be collected for safety reasons. Furthermore, a tank 250 is provided which may be utilized to store water, chemicals or other substances which may be selectively fed to the mixer 201. Furthermore, doors 241 and 243 are provided to provide access to a large storage area at the forward end of the trailer 200. Additional storage area is provided at the reference numeral 245 in front of the mixer 201 with vent fans 247, 249 also being provided adjacent thereto.

Furthermore, within the storage areas accessed by the doors 241, 243, an electrical panel 251, locker 253 and tool and part cabinet 255 may be provided.

In the operation of the mixer 201, it is seen that a loading chute and conveyor are eliminated by the top access 203 wherein hazardous materials to be treated may be dumped. The close proximity of the helix 229 of the mixer blade 225 to the surface 202 of the mixer 201 replaces the functions of the auger in allowing de-lumping of materials placed therein. The tank 250 is analogous to the tank 28 of the mixer truck 10 and the structure of the mixer blade 25 with the inner helix 227 and outer helix 229 replaces the functions of the recirculation conduits 33, 22 and renders the valves 37, 39 unnecessary. Furthermore, the conduit 24 and outlet 26 are replaced in function by the bottom outlet port 207, valve 210 and outlet 209. Finally, the loading station 36 is replaced by the loading station 215.

The means which is utilized to transport the trays 38 from the container loading station 36 of the mixing truck 10 or the loading station 215 of the trailer 200 to a location adjacent the doors 41 on the recycling trailer 40 may be any desired means such as, for example, a conveyer belt system, a lift truck or other vehicle or an overhead crane system. Of course, any desired means may be employed in this regard.

Figure 3:
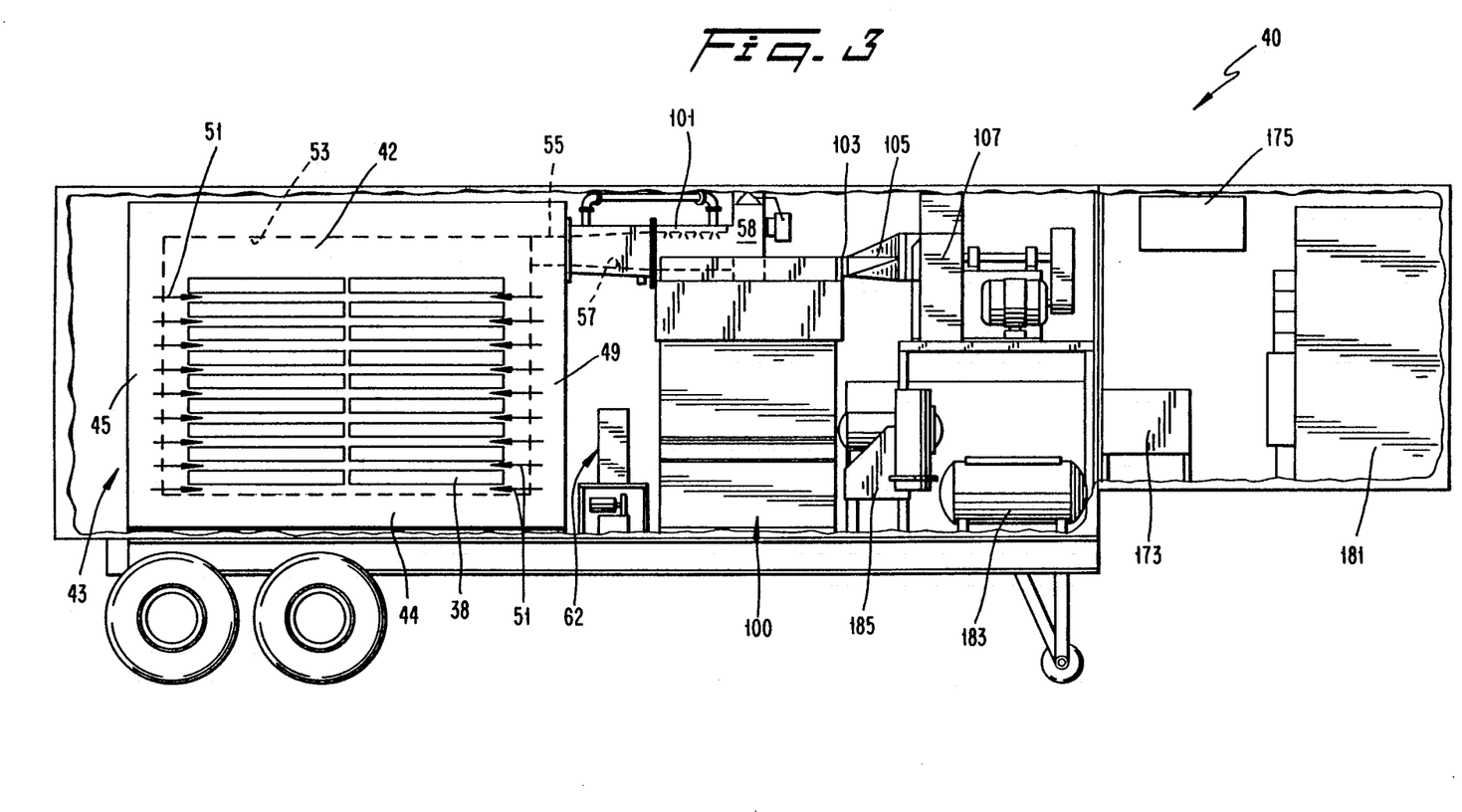
FIG. 3 shows a side view of the fixating trailer vehicle of the present invention.

With particular reference to FIGS. 1 and 3, the fixation trailer is seen to include contained therein a kiln 43 having walls 45, 47 and 49 which are preferably made of a material lined with ceramic fiber so as to facilitate the withstanding of the high temperatures which are generated therein. Burners 51 extend through the walls 45 and 49 so that gas, preferably propane gas, may be ignited and burned within the chamber 53 within the kiln 43. Propane is supplied to the burners 51 from a propane tank which may be contained separately from the trailer 40 with appropriate detachable fluid coupling therebetween.

As seen with reference to FIG. 1, the ceramic fiber-lined doors 41 combine with the walls 45, 47 and 49 and, with reference to FIG. 3, with the ceiling 42 and floor 44 to define a sealable chamber in which the trays 38 are removably placed on shelves (not shown but schematically depicted in FIG. 3 based upon the shown spacing of the trays 38).

The purpose of the kiln or furnace 43 is to provide the energy needed for the final chemical reaction to occur. The examples discussed hereinafter were processed in a box kiln into which containers 38 filled with the reacted-blended material were placed. The box kiln used was designed employing gas fired burners, which may operate with propane or natural gas. The time sequences disclosed in the examples were used in this particular kiln. However, any kiln or furnace design can be used as long as minimum temperature requirements are met. An oven, [a unit capable of obtaining temperatures to 600° F.-700° F.], would not be usable in this operation. Furnaces such as an arc furnace have been used successfully in this recycling procedure. If such devices were employed, the process description would remain generally the same but the kiln time sequences would change.

In the furnace operation the reacted-blended material is placed into a crucible type vessel. Approximately 3 to 4 hours of kiln process time is required to make the material molten. At that point the vitrified material may be removed from the vessel or the reacted-blended material would flow at a rate into the furnace as finished material would flow out creating a continuous kiln sequence operation.

With the trays 38 in place as shown in FIGS. 1 and 3 in the chamber 53, the burners 51 are ignited to raise the temperature within the chamber 53 to a desired level, for example, 2,100 degrees Fahrenheit. During such heating of the substance within the trays 38, gases form which may include hazardous substances incorporated therein in liquid, vapor or particulate form. The chamber 53 includes an outlet 55 connecting the chamber 53 with a scrubber 100 specifically designed to remove all hazardous particulate liquid and vapor byproducts from the gas entering the scrubber 100 via the intake port 57. The scrubber 100 has an inlet port 101 and an outlet port 103 connected to a transition duct 105 in a downstream direction from outlet port 103 which has coupled thereto, on its outlet end, an exhaust fan 107 specifically designed to assist in pulling the gas through the scrubber 100 so that it may be treated.

Figure 4:
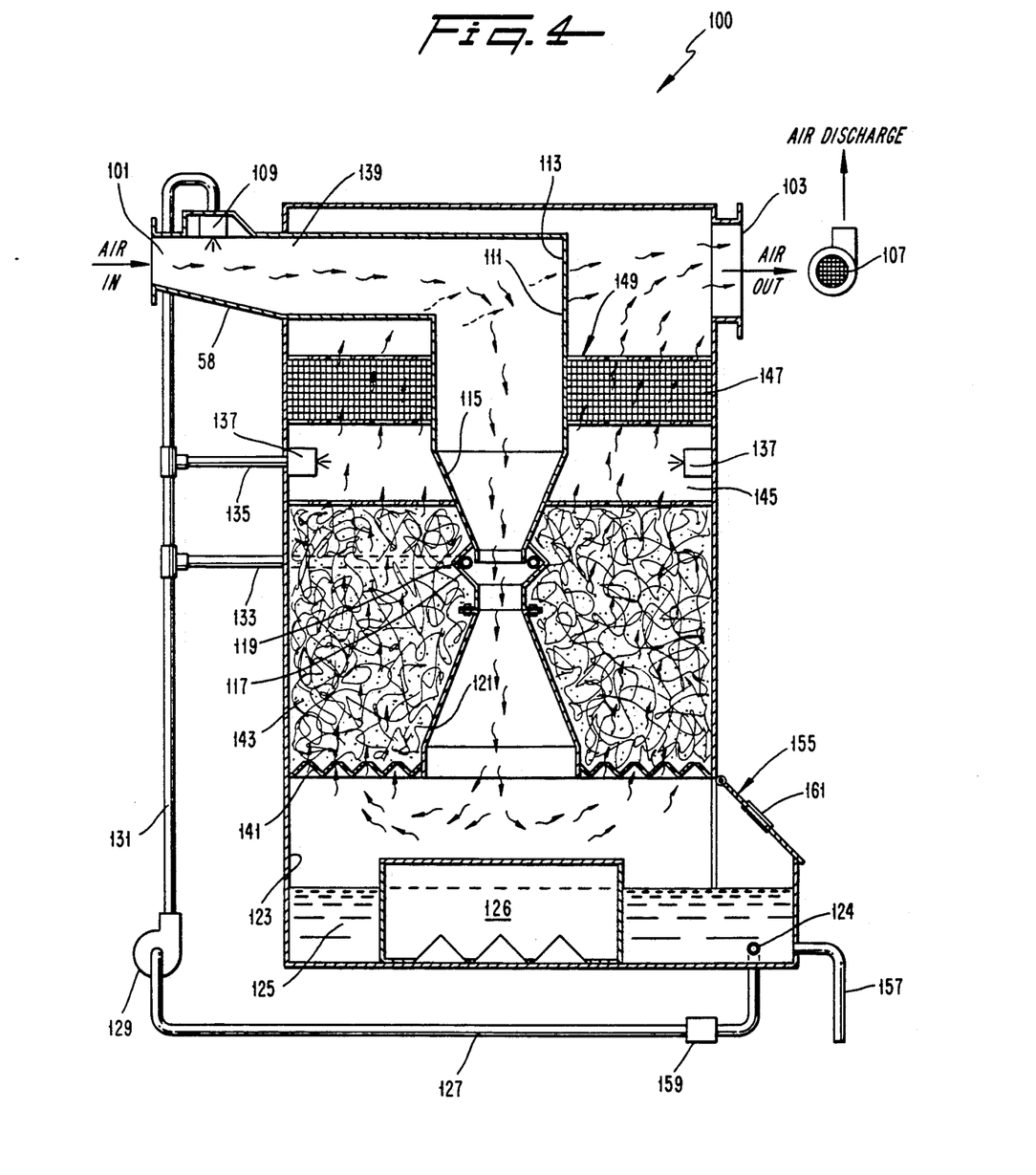
FIG. 4 shows a cross-sectional schematic view of the inventive scrubber sub-combination.

As shown in FIG. 3, the inlet conduit 57 has connected thereto an inlet manifold 58 of the scrubber and, with particular reference to FIG. 4, it is seen that the inlet manifold 58 has mounted therein one or more nozzles 109 designed to spray liquid onto the gas as it enters the scrubber 100. From the inlet manifold 58, the gas is forced to make a right-angle turn by impingement on the wall 113 and then is constrained to descend vertically through a passageway 111 which leads to a converging throat section 115 leading to a venturi throat 117 which is preferably rectangular in cross-sectional shape and which is fed through nozzles 119 with a further supply of low pressure water spray. In practice, it has been found that the venturi structure causes the gas to have accelerated to from four to six times the velocity attained at the inlet manifold 58. After passing through the throat 117, the gas travels through a passage 121 of diverging cross-sectional area which allows gas deceleration. As should be understood, upstream of the throat 117, the gas is dry whereas downstream of the throat 117, the gas is wet by virtue of the liquor sprayed thereon through nozzles 119, and this structure and function sets up complete separation of the wet-dry zones through the venturi structure. For high temperature applications, a quench spray would then be supplied at the scrubber inlet 137, via spray nozzles 107. A portion of the quench water would then be carried to the venturi section. The reaction of the gas with the liquid in the venturi throat 117 is designed to cause the gas to reach near 100 percent saturation while causing any agglomerated particles and other fine materials to be trapped within droplets of scrubbing liquor with the shearing effect of the liquor/gas interaction using a significant portion of the energy which is expended within the throat of the venturi 117 to thereby facilitate the breaking up of the liquor into fine liquid particles offering a large surface area for chemical reactions to start and/or be completed.

After the saturated gas leaves the diverging passage 121, it immediately enters a reservoir 123 at least partially filled with the same liquid which has been sprayed through the nozzles 109 and 119. The reservoir 123 includes a target box 128 fluidly connected with the remainder of the reservoir 123 via ports 122. The target box 128 is centrally located in the reservoir 123 and is the location where most of the gas flow impinges. This liquid is designated in the figure by the reference numeral 125. As should be understood from FIG. 4, a closed circulating system is included in the scrubber 100 which includes the reservoir 123, conduit 127, pump 129, conduit 131, passageway 133 with its nozzle outlets 119, passageway 135 with its nozzle outlets 137, and passageway 139 with its nozzle outlets 109. As should be understood, the structure of the scrubber 100 allows liquid which has been used in the system to drain downwardly into the reservoir 123 wherein the drain outlet 124 allows the liquid to drain into the conduit 127 and to be recirculated through the system.

The impingement of the gas onto the surface of the liquid 125 within the reservoir 123 causes a further expenditure of energy which forces additional scrubbing liquor to be released into the gas stream. During this action the liquid bonded particulates are released into the main liquid storage area 123 for later removal as required through the use of filters (not shown). The high velocity churning, splashing and colliding of gases and liquid offers additional opportunities for chemical reactions to take place.

After impingement of the gas upon the liquid surface in the reservoir 123, the gas makes a 180° turn and begins to ascend up through the scrubber 100.

Before discussing further the flow path of gas from the reservoir 123, it is important to note that from the point of gas entry at the manifold 58 through the energy action/reaction of the reservoir 123, the scrubber system has been designed primarily for cooling, saturation and particulate transfer, both solid and liquid, from the gas phase to the liquid phase. Since this liquid break-up and mixing is quite thorough due to the unique design of inventive scrubber, chemicals may be added into the recycled scrubbing liquor and the resulting reaction will allow for the chemical transfer of contaminants from the gas phase into the liquid phase. The scrubber design allows additives to be injected directly into the liquid recycling system.

Further in this regard, reference is made to FIGS. 1 and 3 which illustrate in the recycling trailer 40 a chemical feed system 62 designed to supply chemicals as desired to the reservoir 123. In a scrubber such as that which is included in the present invention, it is important to treat the gases in such a manner that they are chemically balanced before exiting the scrubber 100. For this purpose, the reservoir 123 may have incorporated therewith a pH sensing system designed to sense the pH of the liquid 125 within the reservoir 123 and responsive to the changes of pH of the liquid 125, causing chemicals from the chemical feed system 62 to be added to the liquid 125 to maintain a predetermined pH level whereupon the chemical feed system 62 is deactivated until the predetermined pH level chosen has changed.

Again, as set forth hereinabove, after impingement of the gas upon the liquid surface in the reservoir 123, the gas makes a 180 degree turn and begins to ascend up through the scrubber 100. Upon making the 180 degree turn, as best seen in FIG. 4, the gas passes through a scrubber section including an orifice plate 141 seen to have a plurality of V-shaped orifices converging in the direction of flow. The orifice plate 141 is specifically designed to disperse the gas uniformly over the entire cross section of the scrubber body and is sized, in the preferred embodiment, for approximately forty percent open area with the further purpose of providing support for the packing 143 downstream thereof. The packing 143 is contained within a liquid/gas dephaser section into which the gas enters after being slowed down by fifty to sixty percent from its speed entering the orifice plate 141 by the reduction in travel area to the forty percent figure described hereinabove. The orifice plate is useful in separating apart virtually all droplets of fluid with particulate matter imbedded therein which are contained in the gas flow. As the gas enters the packing 143, liquor is spraying from the nozzles 137 and runs downwardly into the packing 143 to impinge upon the gas. The combination of this liquid flowing downwardly through the packing and the liquid entrained in the gas from the target box 128 of the reservoir 123 combines to form a layer of scrubbing liquid of approximately two inches to three inches deep above the orifice plate 141. With such a thickness of liquid existing within the packing 143, the gas will bubble through this area and thereafter enter uniformly into the packing 143 above the liquid level. The packing 143 comprises an extended surface scrubber packing having approximately fifty to eighty square feet of surface area for each cubic foot of packing. The nozzles 137 evenly disperse liquid at a sufficient rate to maintain liquid flow through the packing at approximately eighty percent of the total flood volume. In the packing section, the gases are subjected to a slow, tortuous path flow through the packing and counter-current flow of liquid which flows downwardly through the force of gravity through the orifices in the orifice plate 141 and thereafter into the reservoir 123 wherein the liquid is recirculated as described hereinabove.

The packing 143 defines a region in the scrubber 100 which may be termed the "chemical reaction center" of the scrubber where sufficient time is allowed for efficient gas transfer into the scrubbing liquid. As seen in FIG. 4, above the packing 143 and above the nozzles 137, an open air region 145 is provided to facilitate final separation of liquid droplets.

If the gases which enter the packing 143 are still quite hot, the packing 143 with the liquid supply thereto also serves as a condenser which acts to reclaim liquid which would normally be lost in a steam plume. The open area 145 has been described hereinabove as being a region where final separation of liquid droplets may take place. Above this section and downstream therefrom is a demister 147 which is constructed, in the preferred embodiment, of a fine fiber mesh supported by a rigid frame including the passageway 111. The demister 147 removes all remaining liquid from the gas stream. As the demister is located, a small volume of liquid from the packing 143 is allowed to reach the bottom side of the pad which has the function of a final high-efficiency wet filter to provide gas resistance for uniform gas flow. After the gas leaves the fine fiber mesh demister section 147, the gas passes through an orifice plate 149 which is provided to ensure even flow out of the demister pad 147 and toward the scrubber outlet. Downstream of the orifice plate 149, the outlet 103 is provided of a sufficient size to handle the system design flow parameters in cubic feet per minute. The outlet 103 comprises the only outlet from the scrubber 100 and all gas must pass therethrough and thence via the exhaust fan 107 to a discharge. A cleanout box 155 is provided to give access to the reservoir 123 so as to allow the cleaning of the reservoir 123 as desired. The drain 157 allows periodic draining of the reservoir or flow of liquid contained therein to a separate filtering system (not shown) where the liquid may be cleaned. Of course, the filter 159 may be provided in the passage 127 with the filter 159 being located where it may easily be periodically cleaned.

The various aspects of the scrubber having been described in great detail, certain parameters of operation will now be disclosed.

As should be understood, due to the high temperatures to which the scrubbing liquid is subjected, inherently, some fluid loss will occur in the form of steam imbedded in the gas flowing out the outlet 103. These losses must be replenished in order to allow the best operation of the scrubber 100. As such, a level sensor may be contained in the reservoir adjacent the cleanout box 155 and connected to a source of additional scrubbing liquid with a pump interposed therebetween. In this way, when the level of fluid 125 and 126 within the reservoir 123 drops below a predetermined level as sensed by the level sensor (not shown), responsible to this sensing, the pump (not shown) will be activated to pump additional scrubbing liquid from a reservoir (not shown) into the reservoir 123 until the level of fluid 125 and 126 within the reservoir 123 rises to a predetermined level as sensed by the above described level sensor. At that point, the above described pump will be deactivated until such time as the level of liquid within the reservoir 123 again is reduced to a predetermined low level.

If desired, the above described pump may be connected to the cleanout box 155 and the cleanout box 155 may be provided with a viewport 161 allowing viewing of the reservoir 123 without opening the cleanout box 155.

In the operation of the inventive scrubber 100, the gas is drawn into the inlet 109 and is immediately quenched at the nozzle 139. The gases move through an impingement duct 111, 113 and directly into a high-energy venturi throat 115, 117, 121. At the venturi, further liquid is sprayed onto the gas through the nozzles 119 and the gas is discharged from the venturi section onto the surface of water within the target box 128 of the reservoir 123 where more mixing and scrubbing takes place.

Thereafter, the mixture is forced through the orifice plate 141 after turning through 180 degrees for liquid-gas separation. As the gases are drawn through the absorption section including the packing 143, the water flowing downwardly from the nozzles 137 combined with the packing structure causes a slow tortuous path to be created which must be traversed by the gas to provide a final cleaning of the gas.

Thereafter, the gas passes through a final demister 147, through a further orifice plate 149 designed to render the flow uniform and thereafter out the outlet 103 and thence via the exhaust fan 107 to discharge.

The scrubbing liquid is recirculated by a pump which supplies water to the inlet quencher 109, venturi throat nozzles 119 and absorption section nozzles 137. The water level within the reservoir 123 is maintained by an overflow sensing level control system.

The scrubber may be set up to concentrate its effectiveness on gas scrubbing, particulate collection or any combination thereof. Materials of the various component parts of the scrubber 100 are designed to handle gas temperatures of at least 2500 degrees Fahrenheit as well as the corrosive nature of the gases.

The scrubber 100 is small in size for the operations which it performs due to the central passage surrounded by an annulus to provide an elongated flow path within a small area.

The recycling truck 40 may be provided with venting means 170, 172, 174, 176, 178 and 180 (FIG. 2) so that heat which is created within the trailer 40 may be dissipated. A separate vent is utilized to vent the gases which are exhausted by the fan 107.

As seen in FIGS. 2 and 3, the trailer 40 may include an office 171 having a desk 173 where forms, charts and records may be stored with the office 171 including a heater/air conditioner 175 as well as control and indicator panels 177, 179. A water tank 181 is provided within the trailer 40 and the water contained therein is supplied to the reservoir 123 of the scrubber 100 in the manner described hereinabove. Additionally, an air compressor 183 may be provided for the convenience of the operator of the trailer 40 so that air may be blown where desired for clean-up purposes and the like. A combustion air fan 185 may also be provided and may be connected by suitable conduits to the interior of the kiln 43 to improve combustion therein of gases flowing out the nozzles 51.

With the inventive mixing truck and recycling trailer having been described in great detail, it is believed instructive to set forth several examples of the use of the present invention in taking hazardous waste materials and transforming them into useful inert substances.

The EPA has published guidelines for an extraction procedure toxicity test. The maximum allowable concentrations of priority pollutant metals after such a procedure are as follows:

TABLE A

| Contaminant | Maximum Concentration in milligrams/liter |
| --- | --- |
| Arsenic | 5.0 |
| Barium | 100.0 |
| Cadmium | 1.0 |
| Chronium | 5.0 |
| Lead | 5.0 |
| Mercury | 0.2 |
| Selenium | 1.0 |
| Silver | 5.0 |

EXAMPLE 1

A filter cake derived from sodium hydroxide precipitation of copper, tin and lead plating baths through a plate and frame filter press includes the following composition:

| Water | 5–45% |
| --- | --- |
| Silica | None |
| Metal Oxide | Mixed copper, tin, lead, nickel, iron .5–15% |
| Alkali | Calcium 5–55% Sodium 1–15% |
| Other | Remainder |

The following procedure was followed to treat this filter cake:
(1) Place 1–5 cubic yards of cake into reactor tank 23.
(2) Add 3–40 gallons of sodium hydroxide beads.
(3) Add 2–20 gallons of water.
Allow water to react with sodium hydroxide which in turn will react with the metals in the cake in an oxidation reaction.
(4) Blend 5–70 gallons of bonding clay into the reacted material.
3 to 30 minutes blending time.
(5) Blend 10–80 gallons silica sand into reacted material.
3 to 30 minutes blending time.
(6) Place blended-reacted material into containers 38 and transport them into kiln 43.
(7) Dewatering sequence
Set air temperature in kiln 43 at approximately 212°–600° F. for 15–60 minutes.
(8) Defuming sequence
Set air temperature in kiln 43 at 800°–1500° F. for 15–60 minutes.
(9) Vitrification sequence
Set air temperature in kiln 43 at 1800°–2250° F. for 60–120 minutes.
Remove containers 38 from kiln, let cool and remove vitrified material from containers 38.

After completing the above procedure, material treated within the ranges exemplified above was tested by Government leeching procedures and found to contain the following materials in the following proportions which should be compared with the maximum allowable concentrations as set forth in Table A:

| Arsenic (As) | 0.006 mg/l |
| --- | --- |
| Barium (Ba) | less than 0.2 mg/l |
| Cadmium (Cd) | 0.01 mg/l |
| Chromium (Cr) | less than 0.06 mg/l |
| Lead (Pb) | 0.1 mg/l |
| Mercury (Hg) | 0.001 mg/l |
| Selenium (Se) | 0.019 mg/l |
| Silver (Ag) | less than 0.03 mg/l |

EXAMPLE 2

A filter cake derived from calcium hydroxide precipitation of iron and nickel etching operation to a drum filter includes the following composition:

| Water | 15–60% |
| --- | --- |
| Silica | 4–20% |
| Metal Oxide | Mixed nickel, iron, chrome, lead .5–15% |
| Alkali | Calcium 10–45% Magnesium .5–5% |
| Other | Remainder |

The following procedure was followed to treat this filter cake:
(1) Place 1–5 cubic yards of cake into reactor tank 23.
(2) Add 3–30 gallons of sodium hydroxide beads.
(3) Add 2–20 gallons of water.
Allow water to react with sodium hydroxide which in turn will react with the metals in the cake in an oxidation reaction.
(4) Blend 3–20 gallons of bonding clay into the reacted material.
3 to 30 minutes blending time.
(5) Blend 5–40 gallons silica sand into reacted material.
3 to 30 minutes blending time.
(6) Place blended-reacted material into containers 38 and transport them into kiln 43.
(7) Dewatering sequence
Set air temperature in kiln 43 at approximately 212–600° F. for 15–60 minutes.
(8) Defuming sequence
Set air temperature in kiln 43 at 700–1200° F. for 155–90 minutes.
(9) Vitrification sequence
Set air temperature in kiln 43 at 1800–2250° F. for 60–120 minutes.
Remove containers 38 from kiln, let cool and remove vitrified material from containers 38.

After completing the above procedure, material treated within the ranges exemplified above was tested by Government leeching procedures and found to contain the following materials in the following proportions which should be compared with the maximum allowable concentrations as set forth in Table A:

| Arsenic (As) | 0.004 mg/l |
| --- | --- |
| Barium (Ba) | 0.1 mg/l |
| Cadmium (Cd) | 0.04 mg/l |
| Chromium (Cr) | less than 0.06 mg/l |
| Lead (Pb) | 0.2 mg/l |

| | |
|---|---|
| Mercury (Hg) | 0.002 mg/l |
| Selenium (Se) | 0.010 mg/l |
| Silver (Ag) | less than 0.03 mg/l |

EXAMPLE 3

A filter cake derived from chrome - nickel anodizing operation, precipitation with ferrous sulfate to a plate and frame filter press includes the following composition:

| | |
|---|---|
| Water | 55-90% |
| Silica | 0-5% |
| Metal Oxide | Iron, chrome, nickel, silver, cadmium, barium, zinc 2-20% |
| Alkali | Calcium 5-25% |
| Oil | 1-5% |
| Other | Remainder |

The following procedure was followed to treat this filter cake:
(1) Place 1-5 cubic yards of cake into reactor tank 23.
(2) Add 3-20 gallons of sodium hydroxide beads.
   Add 3-20 gallons of sodium carbonate.
(3) Add 5-30 gallons of water.
   Allow water to react with sodium hydroxide which in turn will react with the metals in the cake in an oxidation reaction.
(4) Blend 10-40 gallons of bonding clay into the reacted material.
   3 to 30 minutes blending time.
(5) Blend 40-100 gallons silica sand into reacted material.
   3 to 30 minutes blending time.
(6) Place blended-reacted material into containers 38 and transport them into kiln 43.
(7) Dewatering sequence
   Set air temperature in kiln 43 at 250°-650° F. for 30-90 minutes. (8) Defuming sequence
   Set air temperature in kiln 43 at 750°-1200° F. for 30-90 minutes.
(9) Vitrification sequence
   Set air temperature in kiln 43 at 1800°2250° F. for 60-120 minutes.
Remove containers 38 from kiln, let cool and remove vitrified material from containers 38.

After completing the above procedure, material treated within the ranges exemplified above was tested by Government leeching procedures and found to contain the following materials in the following proportions which should be compared with the maximum allowable concentrations as set forth in Table A:

| | |
|---|---|
| Arsenic (As) | 0.006 mg/l |
| Barium (Ba) | less than 0.2 mg/l |
| Cadmium (Cd) | 0.02 mg/l |
| Chromium (Cr) | 0.18 mg/l |
| Lead (Pb) | less than 0.1 mg/l |
| Mercury (Hg) | less than 0.001 mg/l |
| Selenium (Se) | 0.003 mg/l |
| Silver (Ag) | less than 0.03 mg/l |

EXAMPLE 4

A filter cake derived from various plating lines, i.e., nickel-chrome, copper zinc — precipitated with magnesium hydroxide to a plate and frame filter press includes the following composition:

| | |
|---|---|
| Water | 50-85% |
| Silica | 0-5% |
| Metal Oxide | Nickel, chrome, copper, zinc, tin, iron - 5-15% |
| Alkali | Magnesium - 5-25% |
| Other | Remainder |

The following procedure was followed to treat this filter cake:
(1) Place 1-5 cubic yards of cake into reactor tank 23.
(2) Add 5-40 gallons of sodium metabisulfate with 2-15 gallons acetic acid and 2-15 gallons water.
   Allow to react for 10-60 minutes.
(3) Add 10-40 gallons sodium hydroxide and 10-40 gallons of sodium carbonate plus 3-15 gallons of water.
   Allow to react for 5-60 minutes.
(4) Blend 5-30 gallons of bonding clay into the reacted material.
   3 to 30 minutes blending time.
(5) Blend 5-30 gallons silica sand into reacted material.
   3 to 30 minutes blending time.
(6) Blend 1-10 gallons finely ground cullet into reacted material.
   3 to 30 minutes blending time.
(7) Place blended-reacted material into containers 38 and transport them into kiln 43.
(8) Dewatering sequence
   Set air temperature in kiln 43 at 250°-600° F. for 15-90 minutes.
(8) Defuming sequence
   Set air temperature in kiln 43 at 800°-1400° F. for 60-120 minutes.
(9) Vitrification sequence
   Set air temperature in kiln 43 at 1800°-2200° F. for 60-120 minutes.
Remove containers 38 from kin, let cool and remove vitrified material from containers 38.

After completing the above procedure, material treated within the ranges exemplified above was tested by Government leeching procedures and found to contain the following materials in the following proportions which should be compared with the maximum allowable concentrations as set forth in Table A:

| | |
|---|---|
| Arsenic (As) | 0.002 mg/l |
| Barium (Ba) | less than 0.2 mg/l |
| Cadmium (Cd) | less than 0.01 mg/l |
| Chromium (Cr) | 0.06 mg/l |
| Lead (Pb) | less than 0.1 mg/l |
| Mercury (Hg) | 0.003 mg/l |
| Selenium (Se) | 0.049 mg/l |
| Silver (Ag) | less than 0.03 mg/l |

As stated hereinabove, after the entire process of the present invention has been carried out, the inorganic constituent materials have bound into a silicate matrix which is inert and inseparable by typical physical or chemical means. This is to be contrasted with the prior art systems which surround hazardous waste in an inert jacket which when broken, cracked or otherwise damaged allows release of the hazardous materials. The silicate matrix forming the finished product of the present invention may be broken, cracked, even pulverized without release of hazardous wastes, which are inseparably bonded into the silicate matrix.

As such, there are a large number of uses to which the inventive finished product may be put. Thus, the finished product may safely be used to make grinding wheels, stones, sandpaper, shot blast material and other abrasives, refractory materials such as brick and other masonry materials, road bed materials such as the base thereof, ceramic glazes, pigments, frit, colorants, building materials such as roofing materials, flooring, wall tiles, faschia, etc. Numerous other applications exist.

Accordingly, an invention has been disclosed in apparatus and process form which fulfills all of the objects set forth hereinabove and provides an invention combining mobility with safety while providing a safe, inert end product with a multitude of uses. Of course, various changes, modifications and alterations in the teachings of the present invention may be made without departing from the intended spirit and scope thereof. As such, it is intended that the present invention only be limited by the terms of the appended claims.

We claim:

1. A method of recycling inorganic hazardous waste material into useful products by chemically fixing inorganic constituent materials of said inorganic hazardous waste into a silicate matrix consisting essentially of the steps of:
   (a) loading an inorganic hazardous waste material into a mixing chamber;
   (b) mixing said material in said chamber with chemicals comprising inorganic alkaline materials, acid materials or both, causing an oxidation-reduction reaction to occur, and mixing said oxidation-reduction reaction product with further chemicals comprising silicates;
   (c) conveying said mixed material to a heating chamber;
   (d) heating said material to a sufficiently high temperature to cause vitrification to occur and to chemically fix said inorganic constituents of said inorganic hazardous waste into a silicate matrix to produce a vitrified, silicate-based, inert material;
   (e) removing from said material particulate laden gas formed during said heating step, said particulate laden gas including solid and liquid particulates and gaseous contaminants; and
   (f) scrubbing said gas with a scrub liquid to remove particulates therefrom and adjusting the pH of said scrub liquid to transfer contaminants from the gas phase to the liquid phase.

2. The method of claim 1, wherein said heating chamber comprises a kiln or furnace and said heating step includes the step of heating said material to at least 1500° F.

3. The method of claim 1, further including the step of collecting dust adjacent said mixing chamber.

4. A method of recycling inorganic hazardous waste material into useful products by chemically fixing inorganic constituent materials of said inorganic hazardous waste into a silicate matrix comprising the steps of:
   (a) loading an inorganic hazardous waste material into a mixing chamber;
   (b) mixing said material in said chamber with chemicals selected from the group consisting of inorganic alkaline materials, acid materials, water and a combination of two or more thereof;
   (c) causing an oxidation-reduction reaction to occur;
   (d) mixing said oxidation-reduction reaction product with further chemicals comprising adding bonding clay to said oxidation-reduction reaction product and blending for 3-30 minutes, and thereafter adding silica sand thereto and blending for 3 to 30 minutes;
   (e) conveying said mixed material to a heating chamber;
   (f) heating said mixed material at 1800°-2250° F. for 60-120 minutes to cause vitrification to occur and to chemically fix said inorganic constituents of said inorganic hazardous waste into a silicate matrix to produce a vitrified, silicate-based, inert material;
   (g) removing from said material particulate laden gas formed during said heating step, said particulate laden gas including solid and liquid particulates and gaseous contaminants; and
   (h) scrubbing said gas with a scrub liquid to remove particulates therefrom and adjusting the pH of said scrub liquid to transfer contaminants from the gas phase to the liquid phase.

5. The method of claim 4, wherein said heating step includes:
   (a) a dewatering sequence carried out at 212°-600° F. for 15 to 60 minutes;
   (b) thereafter, a defuming sequence carried out at 700°-1200° F. for 15 to 90 minutes;
   (c) finally, a vitrification sequence carried out at 1800°-2250° F. for 60 to 120 minutes.

6. The method of claim 4, wherein said heating step includes:
   (a) a dewatering sequence carried out at 250°-650° F. for 30 to 90 minutes;
   (b) thereafter, a defuming sequence carried out at 750°-1200° F. for 30 to 90 minutes;
   (c) finally, a vitrification sequence carried out at 1800°-2250° F. for 60 to 120 minutes.

7. The method of claim 4, wherein said heating step includes:
   (a) a dewatering sequence carried out at 250°-600° F. for 15 to 90 minutes;
   (b) thereafter, a defuming sequence carried out at 800°-1400° F. for 60 to 120 minutes;
   (c) finally, a vitrification sequence carried out at 1800°-2250° F. for 60 to 120 minutes.

8. A method of recycling inorganic hazardous waste material into useful products by chemically fixing inorganic constituent materials of said inorganic hazardous waste into a silicate matrix consisting essentially of the steps of:
   (a) mixing an inorganic hazardous waste material with chemicals selected from the group consisting of inorganic alkaline materials, acid materials, water and a combination of two or more thereof;
   (b) causing an oxidation-reduction reaction to occur;
   (c) mixing said oxidation-reduction reaction product with silicates;
   (d) heating said mixture of said oxidation-reduction reaction product and said silicates to a sufficiently high temperature to cause vitrification to occur and to chemically fix said inorganic constituents of said inorganic hazardous waste into a silicate matrix to produce a vitrified, silicate-based, inert material;
   (e) removing particulate laden gas, formed during said heating step, from said heated mixture, said particulate lade gas including solid and liquid particulates and gaseous contaminants; and (f) scrubbing said gas with a scrub liquid to remove particulates therefrom and adjusting the pH of said scrub liquid to transfer contaminants from the gas phase to the liquid phase.

9. A method of recycling inorganic hazardous waste material into useful products by chemically fixing inorganic constituent materials of said inorganic hazardous waste into a silicate matrix consisting essentially of the steps of:

(a) mixing an inorganic hazardous waste material with chemicals selected from the group consisting of inorganic alkaline materials, acid materials, water and a combination of two or more thereof;

(b) causing an oxidation-reduction reaction to occur;

(c) mixing said oxidation-reduction reaction product with silicates;

(d) heating said mixture of said oxidation-reduction reaction product and said silicates to a sufficiently high temperature to cause vitrification to occur and to chemically fix said inorganic constituents of said inorganic hazardous waste into a silicate matrix to produce a vitrified, silicate-based, inert material;

(e) removing particulate laden gas, formed during said heating step, from said heated mixture, said particulate laden gas including solid and liquid particulates and gaseous contaminants; and (f) scrubbing said gas with a scrub liquid to remove particulates therefrom and adjusting the pH of said scrub liquid to transfer contaminants from the gas phase to the liquid phase, said scrubbing including the steps of:

(i) spraying a flow of said gas with said scrub liquid, (ii) increasing the flow velocity of said gas, (iii) spraying said gas with said scrub liquid, (iv) impinging said gas on the surface of a body of said scrub liquid while causing said gas to reverse direction, (v) flowing said gas through an extended surface, and (vi) flowing said gas through a demister.

* * * * *